March 10, 1953     E. A. HURD     2,630,669
LAWN EDGER

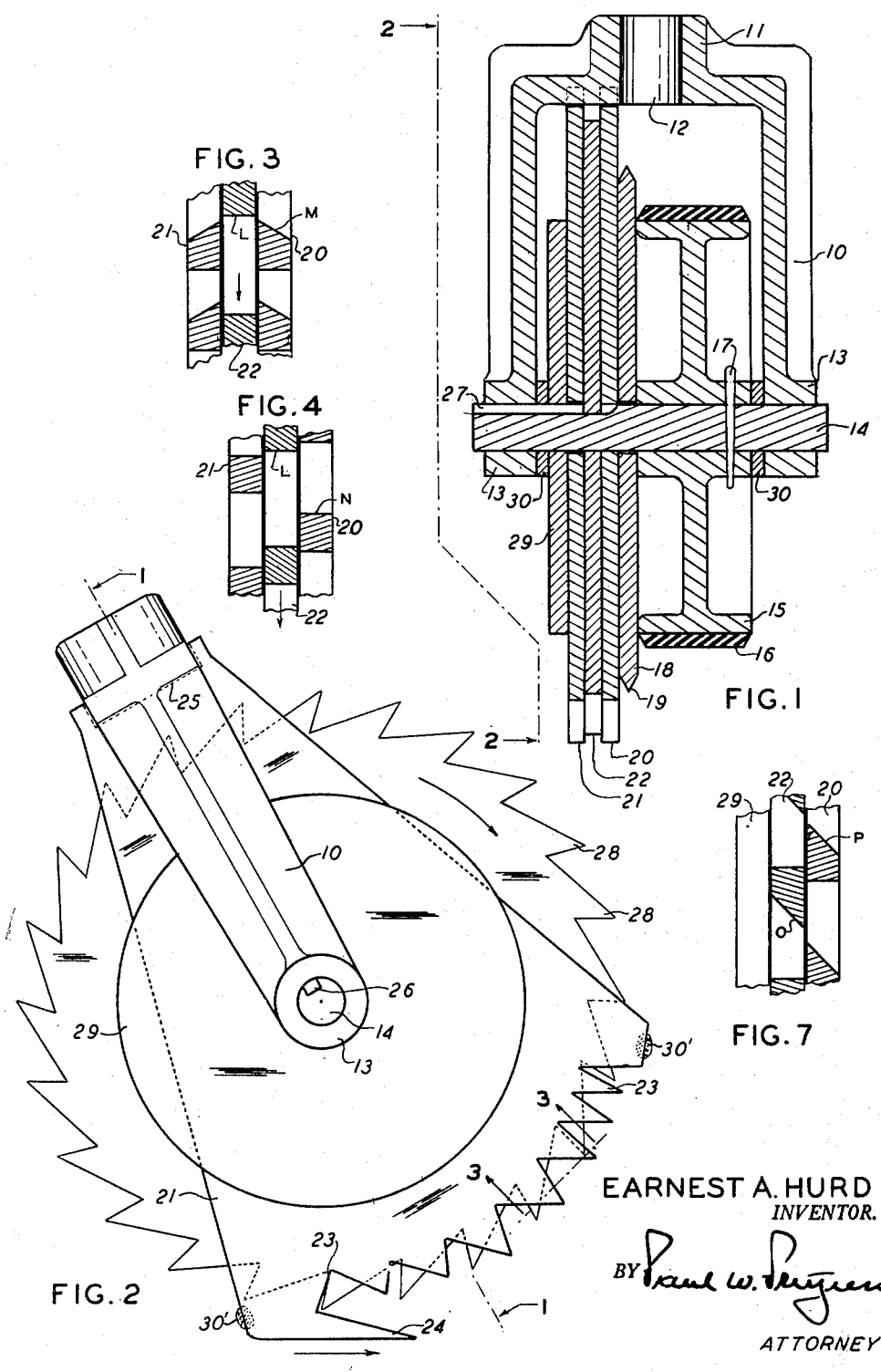

Filed July 10, 1950     2 SHEETS—SHEET 2

EARNEST A. HURD
INVENTOR.

BY *Paul W. ...*

ATTORNEY

Patented Mar. 10, 1953

2,630,669

UNITED STATES PATENT OFFICE 2,630,669

LAWN EDGER

Earnest A. Hurd, Los Angeles, Calif.

Application July 10, 1950, Serial No. 172,963

13 Claims. (Cl. 56—256)

This invention relates to a tool for trimming the edges of lawns and grass plots, and specifically to a tool of the type which has a rotating, toothed cutting member and a relatively stationary cutting member cooperating therewith.

A purpose of the invention is to provide a tool which may be used for trimming along the exposed edge of a grass plot, such as that bordering a flower bed and, with equal facility, for trimming along the edge of a concrete pavement.

A purpose of the invention is to provide a tool of the described type in the use of which a wiry grass may be trimmed by a closely spaced succession of cuts.

A purpose of the invention is to provide a tool of the described type having a multiplicity of cutting edges functioning out of synchronism.

A purpose of the invention is to provide a tool of the described type which is light and easy to propel and which trims to a clean and sharp edge in a single pass.

A purpose of the invention is to provide a tool of the described type which may readily be taken apart for cleaning and sharpening and as readily reassembled.

These and other advantages of the invention will be evident on inspection of the attached drawings and the following description thereof, in which Fig. 1 is a cross section through an illustrative embodiment of the invention, as on the line 1—1 of Fig. 2;

Fig. 2 is a left side elevation of the same, as on the line 2—2 of Fig. 1;

Fig. 3 is a section through certain of the cutting teeth, as on the line 3—3 of Fig. 2;

Fig. 4 is a similar section illustrating a different form of the tooth face and a different arrangement of mating teeth;

Fig. 7 is a section through certain of the cutting teeth, showing an arrangement preferred when only a single fixed cutter is used.

Figure 5:
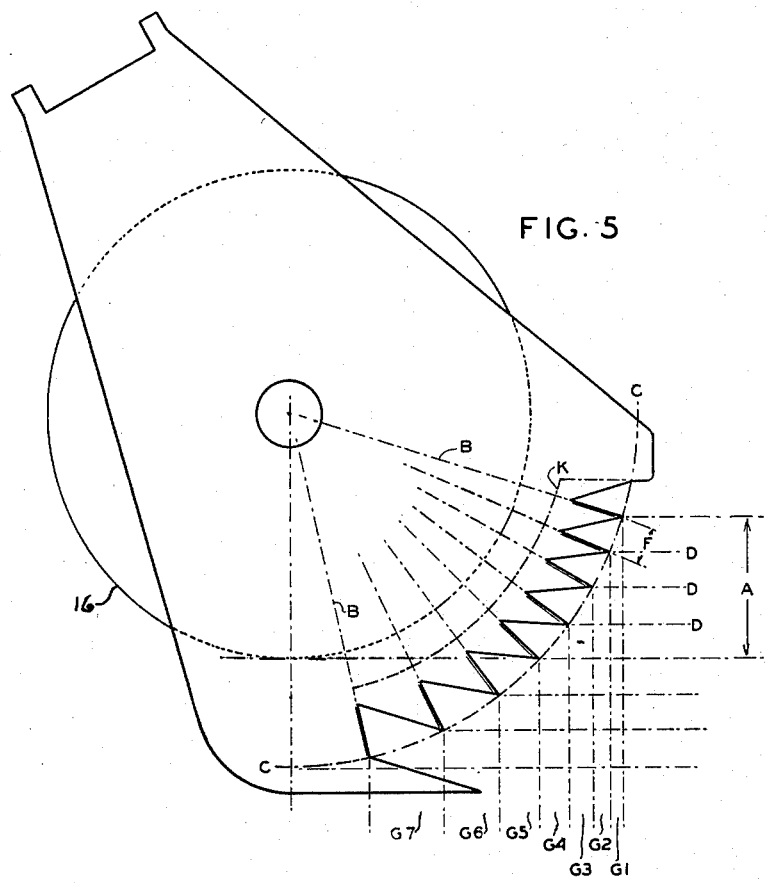
Fig. 5 is a side elevation of one of the fixed cutters, showing a preferred form and spacing of tooth.

Referring first to Figs. 1 and 2, 10 is a yoke, preferably of cast iron, provided with a boss 11 which is bored or cored as at 12 to receive the handle, not shown, by which the tool is propelled. The ends of the yoke arms are provided with bosses 13—13 which are bored in alignment to receive a shaft 14 which is freely rotatable in the bores.

A drive wheel 15, having preferably a corrugated tread or an encircling band 16 of rubber or other resilient material, is made fast to the shaft as by a set screw, a cotter pin or, preferably, by a taper pin as shown at 17. Next to the drive wheel and in contact with its rim is a guard disc 18, freely rotatable on the shaft and preferably but not necessarily sharpened around its circumference as at 19.

The purpose of the guard disc is to reduce the friction which would be caused by the next element 20 in passing over a concrete edge which may be rough or uneven, and to protect the teeth of this element from damage. This disc is desirable rather than essential and may be omitted from the structure. If used it should be of such diameter as to project to but not beyond the roots of the teeth of element 20.

Next to the guard disc on the shaft is a cutting assembly consisting of two non-rotating cutting elements 20 and 21 and, between and in light contact with them, a rotating cutting element 22.

The exact contour of the stationary elements 20 and 21 is immaterial, the essential feature being that the lower portion of the advancing edge should be an arc of a circle described around the axis of the shaft and that this arcuate edge, from a point slightly forward of the bottom center to a level above that of the tread of driving wheel 15, should be serrated as later described. This serrated portion is indicated in Fig. 2 at 23—23.

At the lower end of the serrations a plow point 24, designed to clean the bottom of the cut by lifting stems or roots sufficiently to bring them against the lowermost cutting edge, is depressed slightly below the cutting level. The serrated plates are bored or punched to fit slidably over the shaft and, to hold them in fixed position, are attached in some convenient manner to the yoke 10. This may be accomplished by notching the upper ends, as indicated by dotted lines 25, Fig. 2, to engage the cross bar of the yoke.

The intermediate, rotating cutting member 22 is attached to the shaft to be rotated by it, as for example by an internal lug 26 entering a keyway 27 formed in the shaft. This disc is serrated around its circumference as at 28.

Outside the left hand serrated member 21 I prefer to mount a stiffening disc 29, which may be rotatable on the shaft. The purpose of this disc is to reduce the tendency of member 21 to spring away from member 22 when cutting wiry stems, and its use may be avoided by increasing the inherent stiffness of member 21 or by tying members 20 and 21 in fixed space relation, as will later be described.

The cutting teeth of the rotating cutter are evenly spaced. The spacing is not critical, within limits, but the number of teeth should be not less than the number of inches in the circumference of the drive wheel, nor be greater than four times that number. Increasing the number of teeth and correspondingly reducing the spacing reduces the tendency for the grass encountered by the fixed cutters to be bent forwardly before being cut off and thus makes for a smoother trim.

The spacing of the teeth of the nonrotating cutters is subject to considerable variation but is critical in the respect that, to obtain the best results, it must be unsymmetrical as regards the spacing of the teeth of the rotating cutter. If, for example, the tip-to-tip spacing between two adjacent teeth of the rotating cutter by 20 millimetres, the spacing of the teeth of the nonrotating cutters may be in multiples of 3 millimetres, or any other number which does not divide into 20 to yield a whole number. With such relative spacing, no two pairs of teeth will come into engagement at the same time and the grass stems are snipped off a few strands at a time instead of in relatively large bundles. This is particularly important in trimming lawns of Bermuda or other tough and wiry running grasses.

A simple and desirable manner of locating and spacing the teeth of the nonrotating cutters is shown in Fig. 5. First, the teeth should extend far enough above the tread of the drive wheel to take care of grass which has grown above the level of the concrete. Thus the distance A measured vertically between the tip of the upper tooth and the horizontal tangent to circle 16, representing the tread of the drive wheel, may be of the order of 1" to 1½", or more if preferred.

The cutting faces of the teeth may be arranged in radii B—B and the tip spacing is progressive, increasing downwardly. A desirable way of determining this spacing is to locate the tips of the teeth in an arc C concentric with the shaft and at the intersections with this arc of equally spaced horizontal lines D—D.

Figure 6:
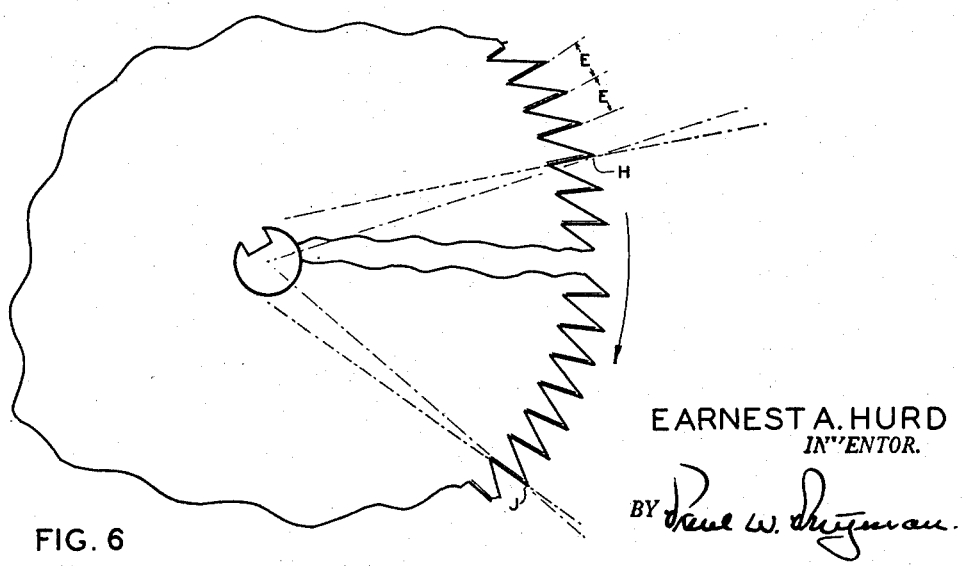
Fig. 6 is a fragmental side elevation of the rotating cutter, showing a preferred form and spacing of tooth, adapted to cooperate with the teeth of the fixed cutter of Fig. 5.

If then the circumferential spacing E of the teeth of rotating cutter 22 (Fig. 6) be very slightly less than the spacing F of the uppermost teeth of the fixed cutter (Fig. 6) the two sets of teeth will engage seriatim and no two cuts will be made simultaneously. This is important as avoiding jerky or intermittent resistance to propulsion and is highly effective in producing a smooth and clean trim with a single passing of the tool.

This particular spacing of the teeth of the rotating cutter is suggestive only, and the desired ends of avoiding uneven resistance and promoting smooth cutting may be attained with any spacing produced by either multiplying or dividing the space between any two adjacent teeth of the fixed cutter by a number terminating in a fraction. It should be noted, however, that it is desirable to have as many teeth in the rotating cutter as may be practicable, as the greater the number of teeth per revolution the smaller will be the number of stems cut through at each tooth engagement.

With the arrangement of fixed cutter teeth illustrated in Fig. 5, the relative distance traversed by the tool between cuts by the various teeth increases downwardly, as indicated by horizontal distances G1, G2, etc. Thus the maximum cutting effect is exercised at or near the surface of the lawn, where the grass stems are the most numerous and where the crowding of stems between the engaging teeth is most to be avoided. The actual distance travelled by the tool between any two cuts is, of course, a factor of the relation of diameter of drive wheel to diameter of rotating cutter, together with the tooth spacing of the latter.

The teeth of the fixed cutters having their cutting edges arranged in radii, the cutting edges of the teeth of the rotating cutter should be at an angle to the radii and may incline either forward or backward. To produce a sufficiently gradual shearing effect this inclination should be not less than say 5° to the radius, and if the rake be forward, as at H in Fig. 6, may be as much greater as the stiffness of the individual teeth of the mating cutters will permit. It will be evident that with a forward rake the first engagement will be between the tips of the teeth, and they will be liable to trip if any tooth be bent out of plane. Ordinarily a forward rake should not exceed about 15°. A backward rake, as at J in Fig. 6, causes the root of the tooth to come into initial engagement and has a tendency to straighten out a tooth which may be slightly bent. As before, the rake should be not less than about 5°, nor should it be greater than about 15° to avoid crowding out.

While Fig. 1 illustrates only a tool having two fixed cutters, it is possible though less desirable to dispense with one of the fixed cutters, placing stiffening plate 29 next to rotating cutter 22. Or if preferred, plate 21 may be retained but deprived of its teeth, as by cutting away along arc K. The advantage of the second alternative is that it permits, as does the use of two fixed cutters, the tacking together of the two plates 20 and 21, at points as close as possible to the ends of arc C—C, as for example by the spot welds indicated at 30'—30' in Fig. 2. This positively prevents the cutters from being sprung apart and materially reduces the requisite thickness of plate from which the cutters are formed. The welds should not be placed where they would interfere with the upward removal of cutter 22 when the tool is disassembled.

The forms of cutting teeth which may be used are illustrated in Figs. 3, 4 and 7. When two fixed cutters are used, the advancing faces of the rotating cutter teeth should preferably be square, as at L, Figs. 3 and 4, while the upper faces of the fixed cutter teeth may be bevelled as at M, Fig. 3, or square as at N, Fig. 4. The sharpened teeth cut somewhat more readily than those having a square corner but become dull more rapidly. In the use of a single fixed cutter both edges may be sharpened, as at O and P in Fig. 7, this being the major advantage in the use of the single fixed cutter.

When two fixed cutters are used, as in Fig. 1, their teeth may be directly opposed, as in Fig. 3, or may be staggered, as in Fig. 4. The first arrangement reduces the tendency to spring the plates, by bringing the grass stem into a position normal to the plane of the rotating cutter before the cut is made. The second arrangement doubles the number of cuts per revolution of the rotating cutter and thereby reduces the force required to produce each cut.

The tool above described may be disassembled for cleaning and sharpening by knocking out taper pin 17 and withdrawing shaft 14, which permits all the other members to be lifted out of the yoke. In reassembling, the shaft is passed through one of the yoke arms, then through the removed elements in the described order, and finally secured in position by replacing the pin. This extreme ease of dismounting and remounting permits the tool to be kept in prime condition by the exercise of only ordinary care.

I claim as my invention:

1. In a hand-propelled edger having a rigid yoke, at the end of a handle, a shaft rotatably mounted in the arms of said yoke and a traction wheel affixed to said shaft: a fixed cutting member in the form of a rigid flat plate medially supported on said shaft and retained against rotation, the lower forward edge of said plate being serrated to form a multiplicity of upwardly and forwardly directed cutting teeth, and a rotating cutting member in the form of a rigid flat disc having its periphery serrated to form a multiplicity of forwardly and downwardly directed triangular cutting teeth, said rotating member being mounted on said shaft to rotate in synchronism with the rotation of said traction wheel and in face to face contact with said fixed member: said traction wheel and cutting members being located between the arms of said yoke and retained against motion endwise of said shaft.

2. Structure as described in claim 1, in which the teeth on said disc are equally spaced and the teeth on said fixed member are spaced at progressively increasing distances in the direction of rotation of said disc.

3. Structure as described in claim 1, in which the teeth on said disc are equally spaced and the teeth on said fixed member are unequally spaced, last said spacing being so disposed that no two teeth of said fixed member can register simultaneously with teeth on said disc.

4. Structure as described in claim 1, in which the teeth on said fixed member are spaced at intervals progressively increasing in the direction of rotation of said cutting disc, and the teeth on said cutting disc are equally spaced at a distance unequal to the spacing of any two teeth on said fixed member.

5. Structure as described in claim 1, in which said fixed cutting member is secured against rotation by an open notch formed at its upper end, said notch spanning the cross bar of said yoke.

6. Structure as described in claim 1, including a second fixed cutting member arranged against the face of said cutting disc which is opposite to first said fixed cutting member.

7. Structure as described in claim 6, in which said fixed members are permanently joined at points outside the path of rotation of said cutting disc and adjacent the ends of the lines of teeth on said fixed cutting members.

8. Structure as described in claim 6, in which the teeth on said fixed cutting members are oppositely disposed.

9. Structure as described in claim 6, in which the teeth on said fixed cutting members are arranged in staggered relation.

10. Structure as described in claim 1, in which the number of cutting teeth on said fixed member is not less than four.

11. Structure as described in claim 1, in which the teeth of said cutting members have their respective cutting faces so disposed as regards radii of said rotating member as to come into register at an angle not exceeding 15°.

12. Structure as described in claim 1, in which the points of the cutting teeth on said fixed cutting member are substantially equally spaced in a vertical direction.

13. Structure as described in claim 1, in which the traction wheel is affixed to the shaft by a removable element, the fixed cutting element is removably retained against rotation, and the rotating cutting element is slidably keyed to the shaft, thereby permitting the device to be disassembled by endwise withdrawal of the shaft.

EARNEST A. HURD.

REFERENCES CITED

The following references are of record in the file of this patent:

UNITED STATES PATENTS

| Number | Name | Date |
|---|---|---|
| 223,485 | Cunningham | Jan. 13, 1880 |
| 990,998 | Maldino | May 2, 1911 |
| 1,351,185 | Muzzy | Aug. 31, 1920 |
| 1,519,050 | Raymer | Dec. 9, 1924 |
| 1,633,063 | Bernarducci | June 21, 1927 |
| 2,149,463 | Orr | Mar. 7, 1939 |
| 2,222,194 | De Bersaques | Nov. 19, 1940 |
| 2,484,276 | Eberhart | Oct. 11, 1949 |
| 2,521,033 | Bell | Sept. 5, 1950 |
| 2,547,328 | Koch | Apr. 3, 1951 |

FOREIGN PATENTS

| Number | Country | Date |
|---|---|---|
| 109,925 | Australia | Feb. 26, 1940 |